United States Patent
Schoenberg

(10) Patent No.: US 10,500,480 B2
(45) Date of Patent: Dec. 10, 2019

(54) ELECTRONIC GAMING MACHINE AND METHOD PROVIDING FOR RECORDING AND STORING VIDEO SIGNAL OUTPUT

(71) Applicant: Incredible Technologies, Inc., Vernon Hills, IL (US)

(72) Inventor: Scott J. Schoenberg, Highland Park, IL (US)

(73) Assignee: INCREDIBLE TECHNOLOGIES, INC., Vernon Hills, IL (US)

(*) Notice: Subject to any disclaimer, the term of this patent is extended or adjusted under 35 U.S.C. 154(b) by 267 days.

(21) Appl. No.: 14/044,424

(22) Filed: Oct. 2, 2013

(65) Prior Publication Data

US 2014/0094305 A1 Apr. 3, 2014

Related U.S. Application Data

(60) Provisional application No. 61/708,843, filed on Oct. 2, 2012.

(51) Int. Cl.
*A63F 13/00* (2014.01)
*A63F 13/86* (2014.01)
*G07F 17/32* (2006.01)
*A63F 13/85* (2014.01)

(52) U.S. Cl.
CPC .............. *A63F 13/00* (2013.01); *A63F 13/86* (2014.09); *G07F 17/3241* (2013.01); *A63F 13/85* (2014.09); *G07F 17/3202* (2013.01); *G07F 17/3225* (2013.01)

(58) Field of Classification Search
CPC .. G07F 17/32; G07F 17/3202; G07F 17/3225; G07F 17/3241; G07F 17/34; G07F 17/3218; A63F 13/00; A63F 2300/634; A63F 13/497; A63F 13/85; A63F 13/86
USPC ................... 463/24, 29, 30, 39–42
See application file for complete search history.

(56) References Cited

U.S. PATENT DOCUMENTS

| | | | | |
|---|---|---|---|---|
| 6,231,443 | B1* | 5/2001 | Asai | A63F 13/10 463/32 |
| 6,336,865 | B1* | 1/2002 | Kinjo | G11B 27/105 273/148 B |
| 6,780,106 | B2* | 8/2004 | DeMar et al. | 463/16 |
| 6,863,608 | B1* | 3/2005 | LeMay | G07F 17/32 463/20 |
| 2002/0147047 | A1* | 10/2002 | Letovsky | G07F 17/32 463/42 |
| 2005/0064926 | A1* | 3/2005 | Walker | G07F 17/32 463/16 |
| 2006/0084488 | A1* | 4/2006 | Kinsley | G07F 17/32 463/16 |
| 2006/0287054 | A1* | 12/2006 | Walker | G07F 17/32 463/17 |

(Continued)

*Primary Examiner* — Chase E Leichliter
(74) *Attorney, Agent, or Firm* — Husch Blackwell LLP; George S. Pavlik

(57) ABSTRACT

An electronic gaming machine having at least one electronic display for visually presenting a video image of a game being played on the machine and a computer electrically coupled to the at least one display. The computer having a programmable processor, memory, at least one video storage unit and a user interface coupled to a control array. The computer transmitting a video signal to the at least one electronic display which produces the video image of the game. The video signal being stored in the at least one video storage unit as a video output file.

10 Claims, 2 Drawing Sheets

(56) References Cited

U.S. PATENT DOCUMENTS

| | | | | |
|---|---|---|---|---|
| 2007/0117617 A1* | 5/2007 | Spanton | ............... | A63F 13/12 |
| | | | | 463/29 |
| 2007/0117635 A1* | 5/2007 | Spanton | ............... | A63F 13/12 |
| | | | | 463/43 |
| 2008/0274798 A1* | 11/2008 | Walker | ............... | G07F 17/32 |
| | | | | 463/25 |
| 2008/0274808 A1* | 11/2008 | Walker | ............... | G07F 17/32 |
| | | | | 463/31 |
| 2009/0082095 A1* | 3/2009 | Walker | ............... | G07F 17/32 |
| | | | | 463/25 |
| 2009/0258708 A1* | 10/2009 | Figueroa | ............ | G07F 17/3295 |
| | | | | 463/43 |
| 2010/0222140 A1* | 9/2010 | Dewaal | ............ | 463/29 |
| 2013/0084991 A1* | 4/2013 | LeMay | ............ | G07F 17/3227 |
| | | | | 463/42 |
| 2013/0143672 A1* | 6/2013 | Azuma | ............ | A63F 13/792 |
| | | | | 463/42 |
| 2013/0337878 A1* | 12/2013 | Shepherd | ............ | G07F 17/3223 |
| | | | | 463/11 |
| 2014/0018165 A1* | 1/2014 | Kern | ............ | A63F 13/86 |
| | | | | 463/31 |
| 2014/0031121 A1* | 1/2014 | Kern | ............ | A63F 13/355 |
| | | | | 463/33 |
| 2014/0315622 A1* | 10/2014 | Walker | ............ | G07F 17/32 |
| | | | | 463/24 |

\* cited by examiner

ELECTRONIC GAMING MACHINE AND METHOD PROVIDING FOR RECORDING AND STORING VIDEO SIGNAL OUTPUT

CROSS REFERENCE TO RELATED APPLICATION

This application claims the benefit of U.S. Provisional Patent Application Ser. No. 61/708,843 filed Oct. 2, 2012, the entirety of which is incorporated herein by reference.

FIELD

The invention pertains generally to electronic gaming machines and related methods, and more particularly to such machines and methods providing for recording, storing, replaying and/or transmitting video output of games played thereon.

BACKGROUND

Electronic gaming machines are generally well known and have been relatively popular for a number of years. Examples of such machines include for example, video slot machines, video poker machines, bar-top gaming devices, and coin-operated amusement devices. Typically, such electronic gaming machines have an electronic display for visually presenting a game array in which the game is carried out. According to such machines, during the course of the game, the display electronically presents the progress and outcome of the game to a player and once a game is complete, a new game is initiated or the game enters a standby or attract mode in which one or more predetermined images are presented in order to attract new players. Accordingly, game play from previous games is not saved as a video file which can be replayed or presented on the machine's display or elsewhere.

Traditionally, once a game is complete and an outcome is obtained, electronic gaming devices either: (a) store the outcome of each game as a summary in text format; (b) store the outcome of the game in such a way that the stored outcome data can be used to re-create the play in visual form on the individual gaming device, or (c) both. Such practices have a number of limitations in that they may require the original game device to reply or reproduce a visual reproduction of a game, do not provide an opportunity to view the progress of the game in real time at a location remote to the gaming machine, and are subject to producing a divergent record of game data in instances where, for example, the outcome summary data was stored correctly but the video screen showed the wrong result (or vice versa).

DETAILED DESCRIPTION

Figure 1:
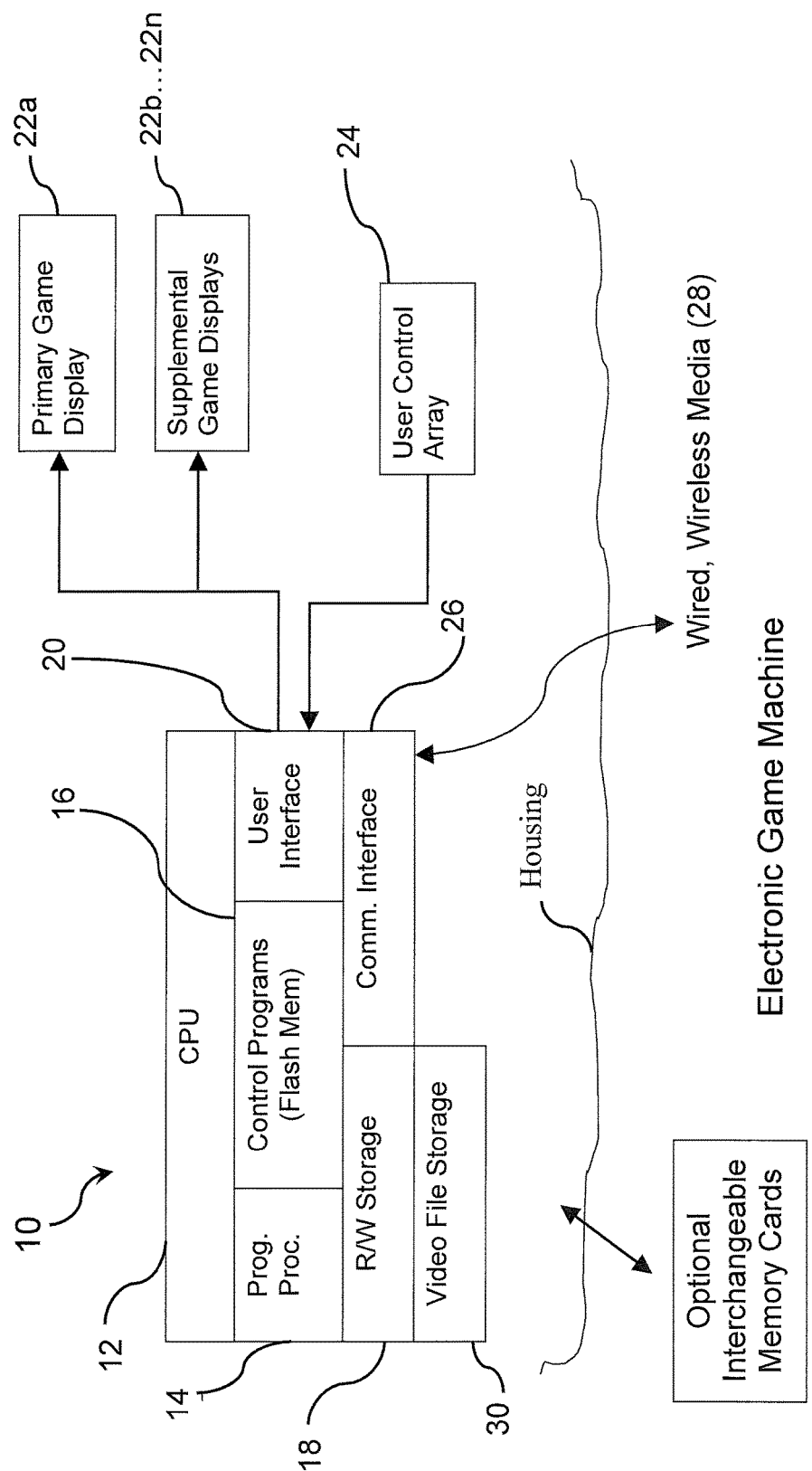
FIG. 1 is a block diagram illustrating a representational view of a gaming machine in accordance herewith.

While this invention is susceptible of embodiment in many different forms, there are shown in the drawings, and will be described herein in specific detail, embodiments thereof with the understanding that the present disclosure is to be considered as an exemplification of the principles of the invention and is not intended to limit the invention to the specific embodiments illustrated.

As described herein, embodiments of the subject invention are directed towards an electronic gaming machine and method having the ability to record video output of games played on the machine, and additionally store, replay and/or transmit the video output to remote locations for subsequent viewing or viewing in real-time.

With reference now to the figures, FIG. 1 illustrates a representational view of the components of the gaming machine 10 according to embodiments of the subject invention. According to such embodiments, the gaming machine 10 can have a computer 12 having control circuitry electrically coupled to one or more game displays 22a, 22b . . . 22n. The game displays 22a, 22b . . . 22n can be any kind of conventional electronically controlled video monitor, including for example, a CRT, high resolution flat-panel LCD, plasma/LED display. It will recognized that any or all of the displays 22a, 22b . . . 22n can further have touch-screen capabilities in order to enable players to input or control certain aspects or features of the game The computer 12 can also include a programmable processor 14, control programs 16 and associated circuitry, a user interface 26 and at least one storage unit 18 electronically coupled to the processor 14. The storage unit 18 can store a plurality of instructions executable by the programmable processor 14. The computer 12 can also include a main memory containing dynamic information processed by the programmable processor 14 during operation, and/or a static memory which contains fixed information, such as an operating system, game programs, and configuration information necessary for the processor 14 to consistently process input from a player through a control array 24.

Embodiments of the subject invention provide that the control array 24 can be implemented as one or more of a keyboard, mechanical lever, a touch-screen, buttons or pads and/or any other means for control, or desired combination of controls, able to accept input from a player and produce output to the game display 22a, 22b in response to a player's input. As shown in FIG. 1, the control array 24 can be electrically coupled to the computer via the user interface 26

According to embodiments set forth herein, the computer 12 can output a video signal to a display 22a, 22b for presenting as a dynamic video image and can further store the video signal in real-time in video file storage unit 30 when a game is being played so as to allow the video signal to be re-played at will. The gaming device 10 can begin storing the video signal when a play (or "pull") begins and can store the video signal exactly as displayed on the screen until the play (or "pull") ends.

Embodiments disclosed herein can further provide for the computer 12 to store each play as a separate and identifiable video output file. According to such embodiments, the gaming device 10 can both play them back on a display 22a, 22b . . . 22n if requested and/or export the video file to a network device or physical storage medium for indefinite retention. In addition, the video file can be played back with or without an overlay which identifies the video output as a pre-recorded game.

The gaming machine can further have communication means 26 for transmitting the video file and related game information to a remote computer, network or display device such that the video file can be stored and/or replayed at the remote location at will and without the use of the original electronic gaming device 10. Such communication means can include a communication interface 26 for communicating with other computers, networks or displays via wired or wireless media 28. According to such embodiments, the video output can be in some form of standard video such as, for example, QuickTime or WMV which can be replayed with any computer or other device having the appropriate playback software.

Figure 2:
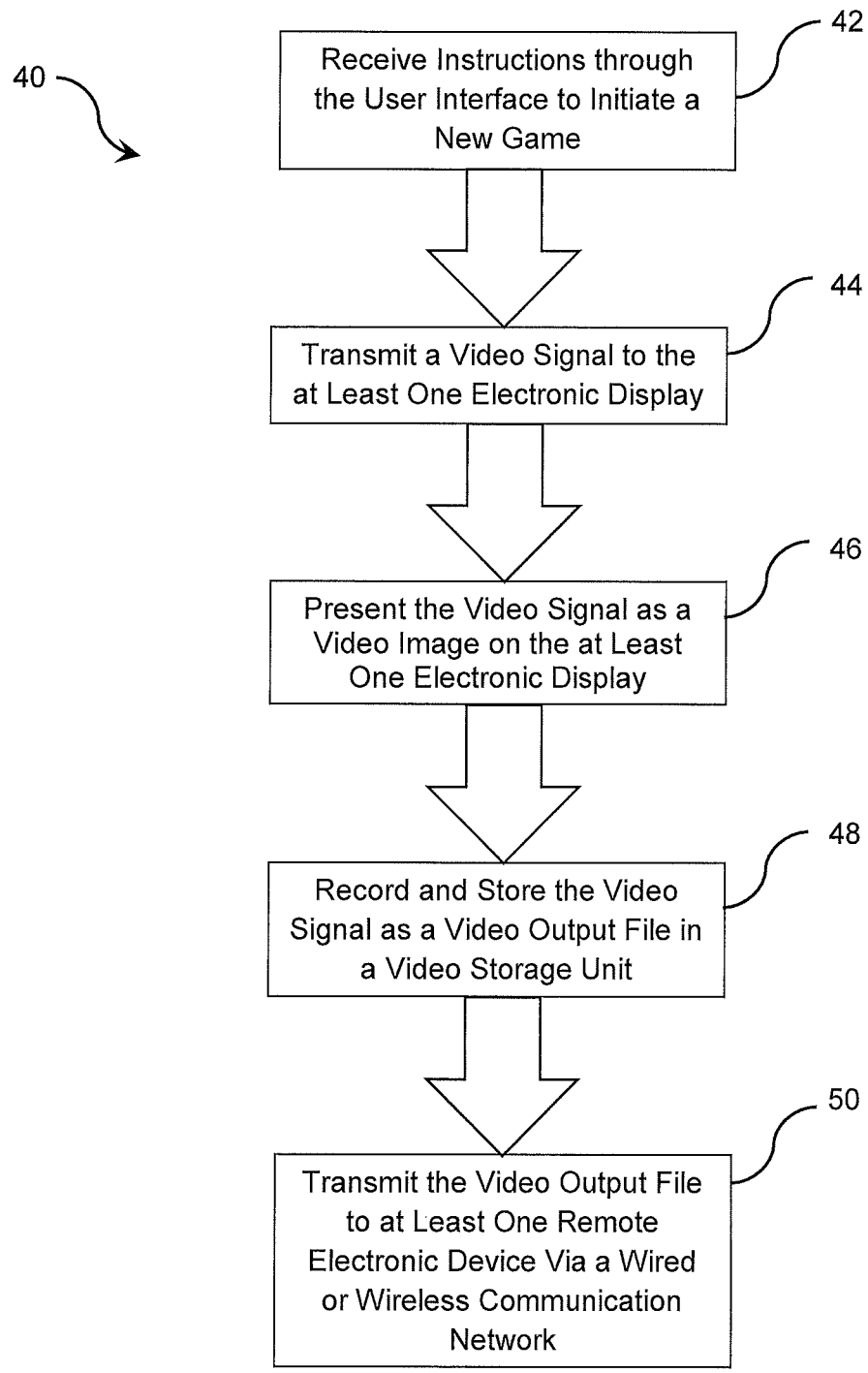
FIG. 2 is a flowchart showing a method in accordance with embodiments of the subject invention.

FIG. 2 is a flowchart illustrating a method 40 in accordance with embodiments of the subject invention. According to such method 40, the computer can receive instructions from a player, as at 42, through the control array to initiate a new game. In carrying out the game, the computer can transmit, as at 44, a video image to at least one electronic display of the gaming machine and the display can present, as at 46, the video signal as a dynamic video image in real-time. According to such embodiments, the method can simultaneously record and store, as at 48, the video signal as a video output file in real-time in the video file storage unit. The video output file can include the video signal associated with a single game or a series of games played in succession.

Embodiments of the subject invention can further provide for replaying, as at 48, the video signal on one of the displays of the gaming machine in real-time or after the conclusion of the game and also transmitting or exporting, as at 50, the video signal to other remote electronic devices, such as for example another networked computer, monitor, PDA, cellphone, laptop, smartphone, tablet or physical storage medium for indefinite retention. In addition, the video file can be played back, as at 52, with or without an overlay which identifies the video output as a pre-recorded game.

It will be recognized that embodiments presented herein can enable a gaming venue to store, transmit and replay the original video output without the original gaming device 10, as opposed to later having to recreate the video file from stored data. Such a benefit can be particularly useful for both situations where a player is contesting the outcome of a game, or for diagnostics purposes, in that a technician at a casino or other gaming establishment can simply email the recorded video output file to a remote service location where it can be watched for purposes of determining if the gaming machine produced an undesired outcome.

Another benefit of such embodiments is that technicians, casino security or others can literally view exactly what the player previously saw on the display (or what the player is now seeing in real time). This is particularly advantageous over known devices which can produce a divergent record of a game in instances where, for example, the outcome summary data was stored correctly but the video screen showed the wrong result (or vice versa). In such situations, it would be very difficult to properly evaluate the outcome of a particular game. Accordingly, embodiments presented herein provide an improvement over known machines in that they can provide a physical correspondence between the stored history and the display.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be add to, or removed from the described embodiments.

What is claimed is:

1. An electronic gaming machine comprising:
   a gaming machine cabinet, the cabinet housing an electronic display, computer electronically coupled to the electronic display and user control array;
   the electronic display for visually presenting a video image of a game being played on the electronic gaming machine;
   the computer having a programmable processor, memory, at least one video storage unit, a communication interface and a user interface coupled to the control array, a video signal being transmitted by the computer to the electronic display,
   wherein the video image is produced by the video signal upon receipt of input at the control array to initiate a first instance of the game, the first instance concluding with at least one of either a winning or non-winning outcome,
   wherein substantially simultaneously with being transmitted to the electronic display, the video signal is stored in the at least one video storage unit as a video output file, the storage of the video signal and generation of the video output file being carried out automatically upon initiation of the first instance of the game and without receipt of manually selectable input to record the game,
   wherein the video output file comprises a reproduction of all of the video image as displayed on the electronic display from when play of the first instance of the game begins to when play of the first instance of the game ends regardless of whether the first instance concluded in a winning or non-winning outcome,
   wherein the reproduction of the video output file is of a format for being presented in visual form on an electronic display of a remote electronic device in substantially identical form as the video image presented on the electronic display of the electronic gaming machine without being recreated from stored game data from the first instance of the game,
   wherein upon transmission of the video signal from the computer to the electronic display of the electronic gaming machine, the video signal is transmitted substantially simultaneously to the remote electronic device for play on a remote electronic display, and
   wherein the video output file comprises the video image of the first instance of the game without video images of a second instance of the game different from the first instance.

2. The electronic gaming machine of claim 1 where the communication interface transmits the video signal to the remote electronic device via a wired or wireless communication network.

3. The electronic gaming machine of claim 1 where the video signal provides a real-time video image of the first new instance of the game for presenting on the display of the electronic gaming machine.

4. The electronic gaming machine of claim 1 where the electronic display of the gaming machine comprises a CRT, LCD, plasma or LED display.

5. The electronic gaming machine of claim 1 where the control array comprises a keyboard, mechanical lever, button or touch-screen.

6. The electronic gaming machine of claim 1 where a new video output file is created for each new instance of the game played on the machine.

7. A method for storing and transmitting a video signal of a game played on an electronic gaming machine comprising:
   providing the electronic gaming machine, the electronic gaming machine having a housing an electronic display, computer electronically coupled to the electronic display and user control array;

receiving input through the control array to initiate a first instance of the game, the first instance concluding with at least one of either a winning or non-winning outcome;

initiating the first instance of the game and transmitting a video signal from the computer to the electronic display of the electronic gaming machine;

presenting the video signal as a video image on the electronic display of the gaming machine, the video image being a visual representation of the first instance of the game;

substantially simultaneously with being transmitted to the electronic display, recording the video signal and creating an electronic video output file from the video signal, the recorded video signal being all of the video image as presented on the electronic display from when play of the first new instance of the game begins to when play of the first new instance of the game ends, the recording of the video signal and creating of the video output file being carried out automatically upon initiation of the first instance of the game regardless of whether the first instance concluded in a winning or non-winning outcome and without receipt of manually selectable input to record the game;

storing the video output file in a video storage unit, the video output file comprising the video image of the first instance of the game without video images of a second instance of the game different from the first instance; and transmitting the video output file to at least one remote electronic device by a wired-or wireless communication network, said transmission of the video output file to at least one remote electronic device being carried out substantially simultaneously to the transmitting the video signal from the computer to the electronic display of the electronic gaming machine.

8. An electronic gaming machine comprising:
an electronic display;
a control array;
a computer electrically coupled to the electronic display and control array, the computer being housed within a cabinet providing the electronic display and control array; and
a video output file comprising a stored video signal,
wherein the stored video signal is a video image of a first instance of a game played on the machine and as presented on the electronic display from when play of the first instance of the game begins to when play of the first instance of the game ends, the first instance ending with at least one of either a winning or non-winning outcome,
wherein the video output file is created and stored in a video storage unit in response to input received from the control array to initiate play of the game, the storage of the video signal and creation of the video output file being carried out automatically upon initiation of the first instance of the game regardless of whether the first instance ended in a winning or non-winning outcome and without receipt of manually selectable input to record the game, and
wherein as the game is being played on the machine, the video output file is stored in a format for being presented in visual form on an electronic display of a remote electronic device in substantially identical form as the video image presented on the electronic display of the electronic gaming machine without requiring recreation of stored game data from the first instance of the game, the video output file comprising the video image of the first instance of the game without video images of a second instance of the game different from the first instance.

9. The electronic gaming machine of claim 8 where the output file is electronically transmitted by the communication interface through wired or wireless connection to the remote electronic device by way of a public or private communication network.

10. The electronic gaming machine of claim 9 where the output file is visually presented on the display of the remote electronic device in real-time.

* * * * *